United States Patent
Pastori

(10) Patent No.: US 8,054,006 B2
(45) Date of Patent: Nov. 8, 2011

(54) POWER SUPPLY OF LUMINOUS SOURCES

(75) Inventor: Ennio Pastori, Ciampino (IT)

(73) Assignee: STMicroelectronics S.r.l., Agrate Brianza (IT)

(*) Notice: Subject to any disclaimer, the term of this patent is extended or adjusted under 35 U.S.C. 154(b) by 347 days.

(21) Appl. No.: 12/363,195

(22) Filed: Jan. 30, 2009

(65) Prior Publication Data

US 2009/0195185 A1 Aug. 6, 2009

(30) Foreign Application Priority Data

Feb. 1, 2008 (EP) .................................. 08425059

(51) Int. Cl.
*H05B 37/02* (2006.01)
*G05F 1/00* (2006.01)
(52) U.S. Cl. .................... 315/294; 315/297; 315/291
(58) Field of Classification Search ................ 315/294, 315/312, 291, 307, 287, 297, 207, 244, 248, 315/258, 283
See application file for complete search history.

(56) References Cited

U.S. PATENT DOCUMENTS

| | | | | |
|---|---|---|---|---|
| 4,585,974 | A | * | 4/1986 | Stupp et al. .................... 315/307 |
| 4,698,554 | A | * | 10/1987 | Stupp et al. .................... 315/307 |
| 6,040,663 | A | * | 3/2000 | Bucks et al. .................... 315/291 |
| 6,094,017 | A | | 7/2000 | Adamson |
| 6,747,420 | B2 | | 6/2004 | Barth et al. |
| 2005/0162101 | A1 | | 7/2005 | Leong et al. |
| 2007/0267984 | A1 | | 11/2007 | Peng |
| 2008/0001547 | A1 | | 1/2008 | Negru |

FOREIGN PATENT DOCUMENTS

WO 2006/056960 A1 6/2006

* cited by examiner

*Primary Examiner* — Daniel D Chang

(74) *Attorney, Agent, or Firm* — Lisa K. Jorgenson; Robert Iannucci; Seed IP Law Group PLLC

(57) ABSTRACT

A power supply of luminous sources is disclosed comprising a first circuit configured to generate a direct voltage signal from an alternating input voltage and a second circuit having in input the direct voltage signal and configured to generate an alternating voltage signal of rectangular wave shape and null average value. The power supply comprises: a third circuit configured to generate a current signal of triangular wave shape from the alternating voltage signal, a fourth circuit configured to extract from the current signal a voltage signal of triangular wave shape and non-null average value, a fifth circuit configured to control the frequency of the alternating voltage signal based on the average value of the voltage signal extracted by the fourth circuit, a sixth circuit configured to rectify said current signal and supply the luminous sources.

27 Claims, 5 Drawing Sheets

POWER SUPPLY OF LUMINOUS SOURCES

BACKGROUND

1. Technical Field

The present disclosure refers to a power supply of luminous sources, in particular power LED diodes.

2. Description of the Related Art

Power supplies are known for LED diodes that comprise a direct voltage source, a DC/DC converter suitable for supplying the LED diodes arranged in series or parallel to each other and at least a sense resistance. If the LED diodes are arranged in series there is uniform light due to the same current that circulates in the diodes but there is the drawback of high supply voltage. If the diodes are arranged parallel to each other the supply voltage is lower but the light of the diodes may undergo variations; further, ballast resistances are used to equalize the currents in all the diodes at the expense of efficiency.

On the market there are currently circuit types of the flyback type for supplying LED diodes. Said circuit types have various drawbacks in the event of use for high output power: great circuit complexity for independent adjustment for each branch of LED diodes of the light flow, significant dimensions, need for the output transformer to be made with low leaked inductance in order to contain losses, problems linked to the buzz of the cores during adjustment of the light flow and high costs.

BRIEF SUMMARY

One embodiment is a high-performance power supply of luminous sources that is more efficient than known power supplies. Said power supply is shown to be particularly useful in the case of supplying LED diodes or other luminous sources that are able to operate with supply currents up to 1.5 A and nominal operating voltages of about 3.5 V. Further, as a normal power supply has output power of approximately 100 W, the power dispensable by the power supply can be distributed between several channels to conform to regulations governing the maximum voltage permitted to supply the LED diodes. The plurality of output channels allows a light flow with chromatic variability arising from the mixture of flows operating on three basis colors, with the intensity of each being adjustable independently of the others.

One embodiment is a power supply for luminous sources comprising:

first means suitable for generating a direct voltage signal starting with an alternating input voltage, second means having in input said direct voltage signal and being suitable for generating an alternating voltage signal of rectangular wave shape and null average value, third means suitable for generating a current signal of triangular wave shape from the alternating voltage signal of rectangular wave shape and null average value, fourth means suitable for extracting from said current signal of triangular wave shape, a voltage signal of triangular wave shape and non-null average value, fifth means suitable for controlling the frequency of the alternating voltage signal of rectangular wave shape and null average value in function of the average value of the output voltage signal from said fourth means, sixth means suitable for rectifying said current signal of triangular wave shape coming from said third means and being suitable for supplying the luminous sources.

One embodiment is a power supply for luminous sources that is very reliable and has efficiency that is greater than that of known power supplies.

In one embodiment, the multichannel power supply is capable of distributing the output power between several channels, each with limited supply voltage and with a stabilized output current.

Further, said power supply enables the output current stabilized for each channel to be selected from a wide range of values.

The power supply comprises a sole controller circuit intended for simultaneously stabilizing the output currents keeping the independent adjustment thereof possible.

The power supply is made in a simple manner and at reduced costs for each light point.

BRIEF DESCRIPTION OF THE SEVERAL VIEWS OF THE DRAWINGS

The features and advantages of the present disclosure will become clear from the following detailed description of an embodiment illustrated by way of non-limiting example in the attached drawings, in which.

DETAILED DESCRIPTION

Figure 1:
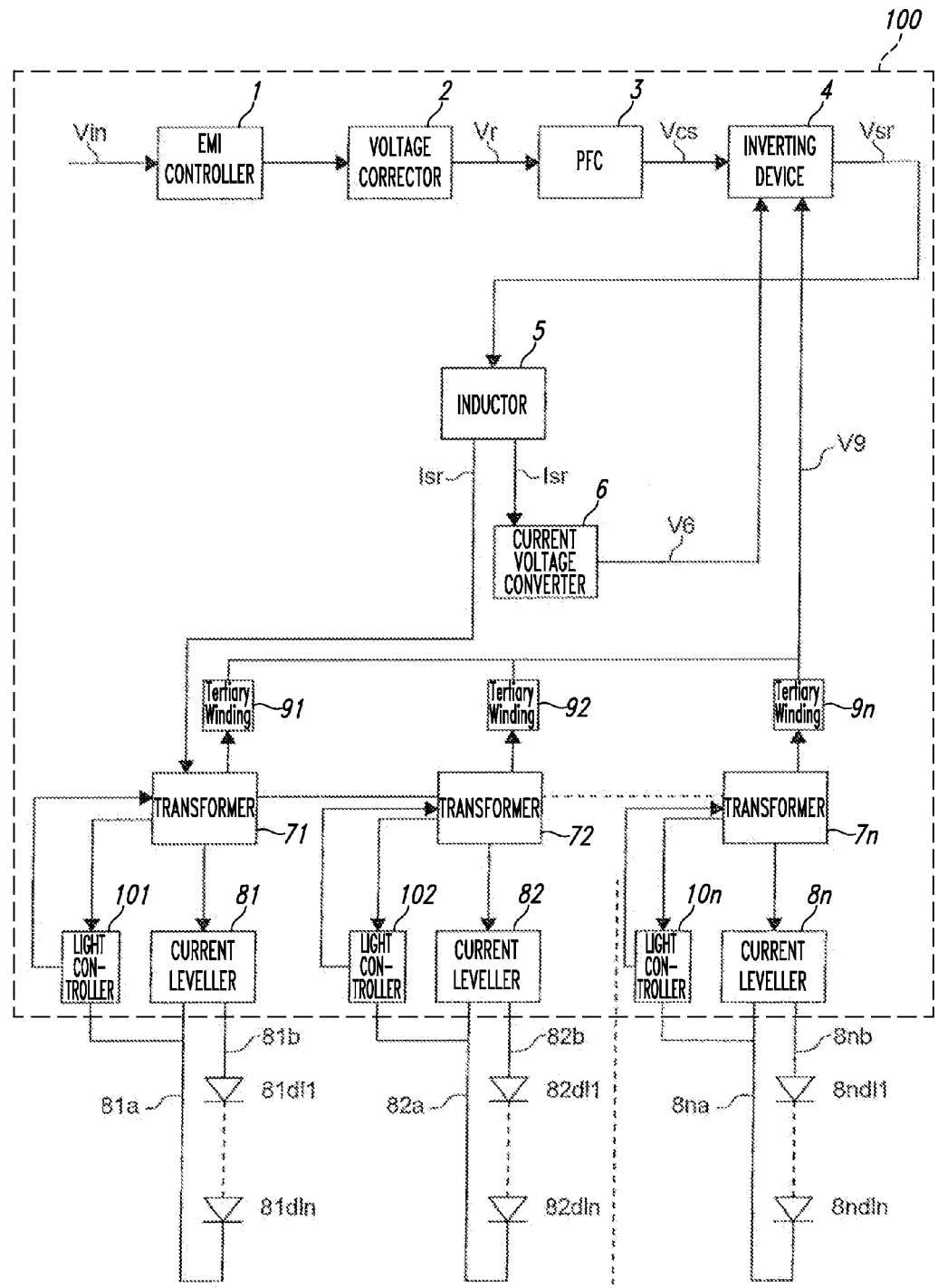
FIG. 1 is a diagram of the power supply of luminous sources according to one embodiment.

With reference to FIGS. 1-10, there is shown a power supply 100 of luminous sources 81*dl*1-8*ndln*, in particular LED diodes, according to one embodiment. The power supply 100 comprises (FIG. 1) a first device 1 that is supplied by the mains voltage Vin and is suitable for containing conducted mains electromagnetic interference within the limits set by standards. The output voltage signal from the device 1 is corrected by the device 2; the corrected voltage signal Vr is an input signal to a device 3 that is suitable for providing stabilized direct voltage Vcs maintaining the network harmonics content conformant to the standards; said device 3 is, for example, a PFC device, a power factor corrector.

The stabilized direct voltage signal Vcs is sent to an inverting device 4 suitable for emitting an alternating voltage signal Vsr of rectangular shape with null average value; the frequency of the signal Vsr is controlled by means outside the device 4.

Figure 2:
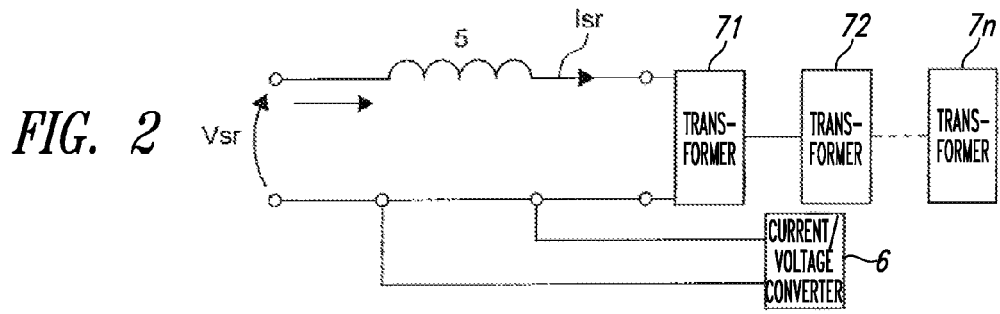
FIG. 2 shows in greater detail a part of the power supply in FIG. 1.
Figure 3:
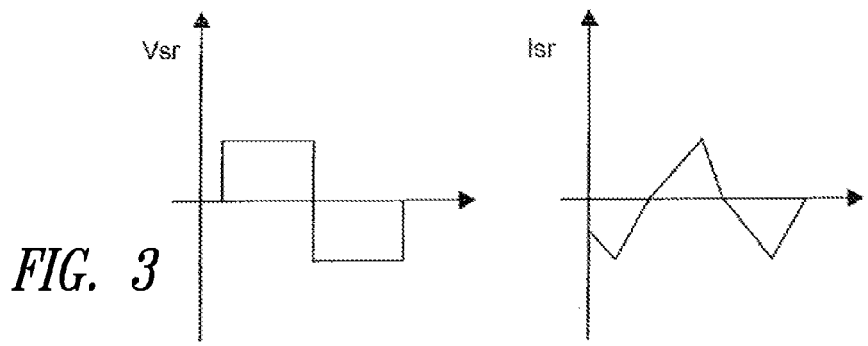
FIG. 3 shows the wave shapes of the signals in play in the circuit in FIG. 2.

The voltage Vsr coming from the device 4 is sent to the inductor 5 that is in series at the subsequent block 6; preferably, in the case of multichannel power supplies, the inductor 5 is in series also to a plurality of blocks 71 . . . 7*n* (FIG. 2). The amplitude of said voltage Vsr is comprised between 200 V and 220 V. The current Isr that circulates through the inductor 5 is alternating, symmetrical, triangular in shape and the amplitude thereof, in the absence of feedback, depends on the frequency of the voltage Vsr; the wave shapes of the current Isr and of the voltage Vsr are shown in FIG. 3.

Figure 4:
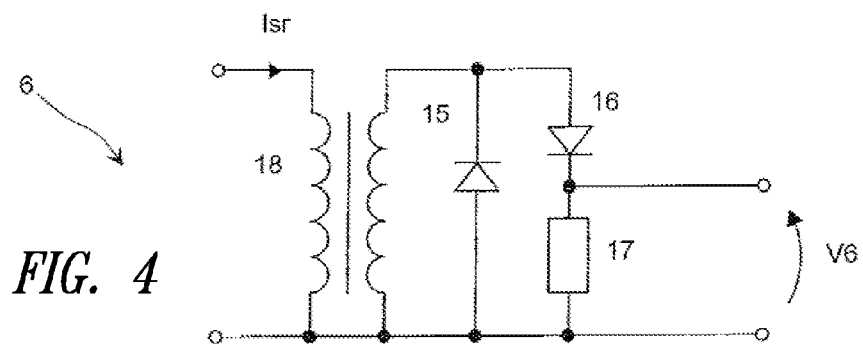
FIG. 4 shows in greater detail a device of the power supply in FIG. 1.
Figure 5:
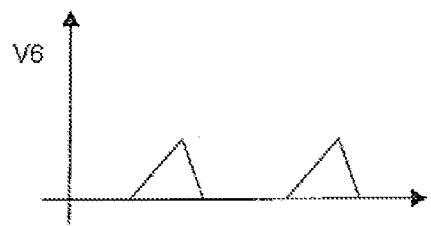
FIG. 5 shows the wave shape of the output signal from the device in FIG. 4.

The current Isr is processed by the device 6 that uses the positive part thereof, creating a voltage V6 that is suitable for reproducing the shape of the positive part of the current Isr (FIG. 4). The device 6 comprises a diode 15 that is parallel to the series of a second diode 16 and a resistance 17; preferably the device 6 comprises a transformer 18, the primary winding of which is connected between the input terminals of the block 6 and a secondary winding connected parallel to the diode 15 and to the series of the second diode 16 and of the resistance 17. The diode 16 enables only the positive part of the current Isr received from the secondary winding of the transformer 18 to flow on the resistance 17 to form the voltage V6 (FIG. 5); the diode 15 ensures that the negative part of the current recirculates on the secondary winding of the transformer 18. The average value Vm6 of the voltage V6 is detected by the device 4 that tries to maintain the average value Vm6 constant, adjusting the operating frequency of the device 4. The transformer 18 enables leakage on the components 15, 16 to be reduced, contributing to increasing the performance of the invention.

Figure 9:
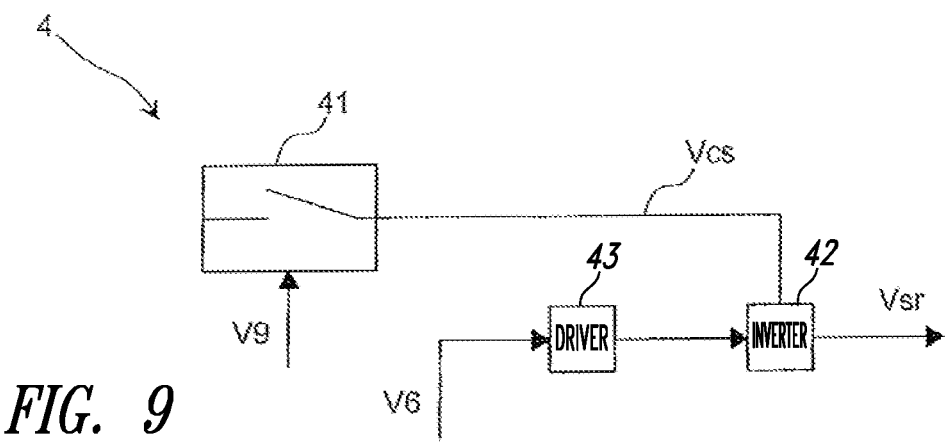

The device 4, better visible in FIG. 9, comprises a device 41, indicated by way of example by a switch, that is suitable for deactivating the device 4 when a voltage signal V9 is received from a device 91, 92 . . . 9n, an inverter 42 supplied by the voltage Vcs and suitable for generating the voltage Vsr and a circuit 43 for driving the inverter 42. The circuit 43 is suitable for extracting the average value Vm6 of the voltage V6 generated by the device 6; once the average value Vm6 of the voltage V6 is known the maximum value Vmax6 of the voltage is known automatically and it is possible to modify the frequency of the signal Vcs in response to the value of the maximum value Vmax6 of the voltage V6. The circuit 43 tends to maintain the maximum value Vmax6 of the voltage V6 constant and acts on the inverter 42 to increase or decrease the frequency of the signal Vsr when the maximum valueVmax6 exceeds or is less than a reference value Vmax6ref.

Figure 6:
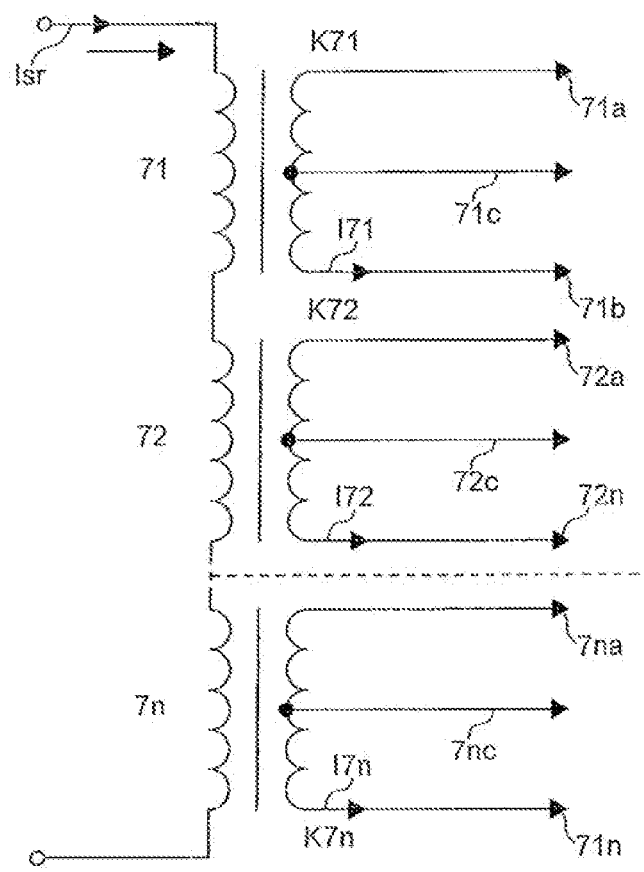
FIGS. 6-10 show in greater detail other components of the power supply in FIG. 1.
Figure 7:
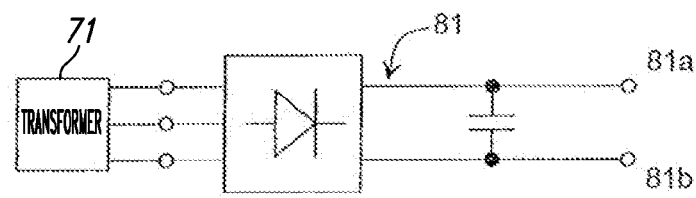
Figure 7:
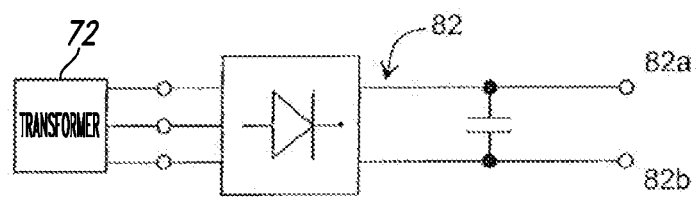
Figure 7:
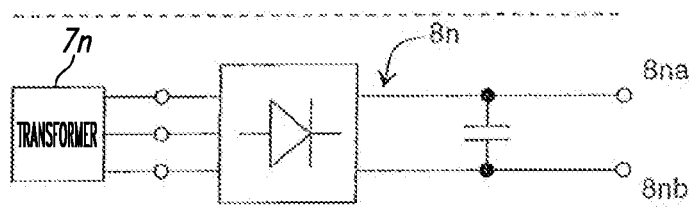
Figure 8:
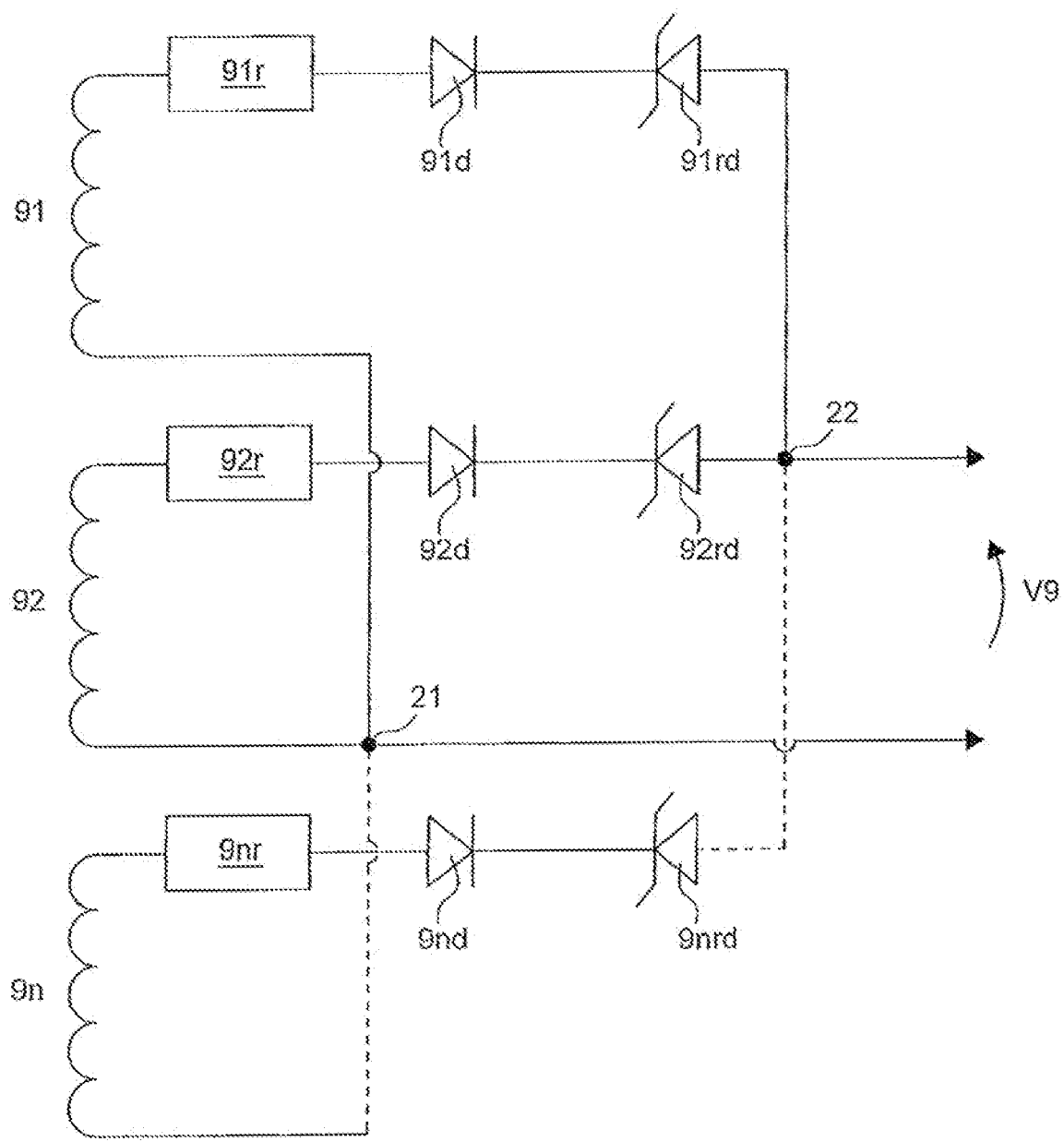

The triangular current Isr is sent to a plurality N of transformers 71 . . . 7n having the primary windings connected in series (FIG. 6). The number of said transformers corresponds to the number of output channels from the power supply. Once the current Isr power supply of luminous sources has been stabilized (which circulates in the primary windings) the currents I71 . . . I7n power supply of luminous sources are stabilized (which circulate in the secondary windings); each of these currents can assume different values according to the respective transformation ratio K71 . . . K7n of each transformer, so also high-value output currents can be controlled by a sole low-value current, contributing to raising the performance of the device 100.

The currents I71 . . . I7n are corrected and leveled by the devices 81 . . . 8n that comprise diodes and capacitors (FIG. 7); the terminals 71a-71c, 72a-72c, . . . 7na-7nc are the input terminals of the respective devices 81, 82 . . . 8n. The capacitors have to manage the ripple component of the currents I71 . . . I7n which, in the absence of the capacitors, would flow in the LED diodes without being productive in terms of light flow but leakage would increase, reducing the life of the LED diodes, lowering the overall performance thereof. To each device 81 . . . 8n a chain of LED diodes 81dl1 . . . 81dln, . . . 8ndl1 . . . 8ndln is connected at the respective output terminals 81a-81b, 82a-82b, . . . 8na-8nb.

Each transformer 71 . . . 7n is provided with a tertiary winding 91 . . . 9n (FIG. 8); the tertiary windings 91 . . . 9n have a common terminal 21 and have the other terminal connected to the series of a resistance 91r . . . 9nr, a diode 91d . . . 92d and a Zener diode 91zd . . . 9nzd the anodes of which are connected together at a terminal 22. The voltage signal V9 located between the terminals 21-22 is sent to the device 4 so as to suspend operation only when one of the Zener diodes 91zd . . . 9nzd starts conducting. This event occurs when the amplitude of the voltage on a tertiary winding is greater than a preset value and also the output voltage of each channel is automatically limited, this output voltage being closely connected to the intervention voltage of the Zener diode.

Figure 10:
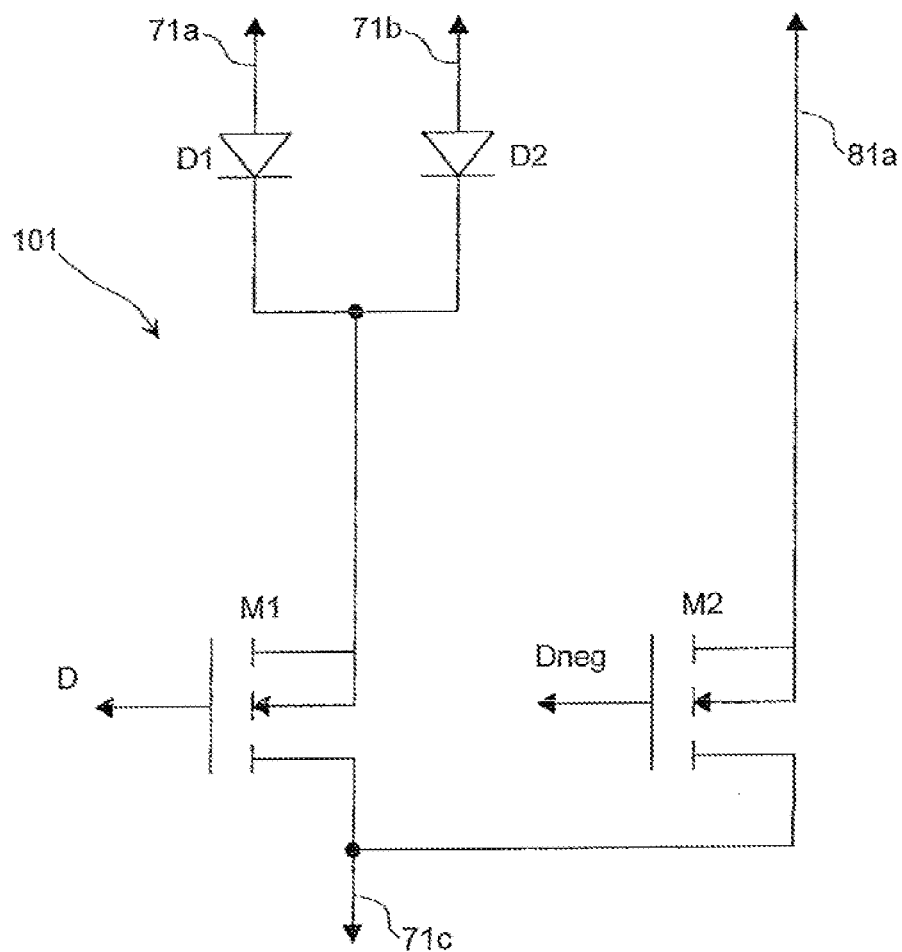

With each device 81 . . . 8n there is associated a device 101 . . . 10n suitable for controlling the light flow independently of the other channels (FIG. 10).

Each device 101 . . . 10n comprises two transistors MOS M1 and M2 driven by a step signal D and by the negated signal thereof; the signal D is generated from the outside at a fixed frequency of about 100 Hz, at a frequency that is not visible to the human eye. The transistors MOS M1 and M2 have a common conduction terminal (source terminal) connected to the central terminal 71c, 72c . . . 7nc of the respective secondary winding of the transformer 71 . . . 7n and the other conduction terminal (drain terminal) connected respectively to the cathodes of a pair of diodes D1 and D2 connected in turn to the terminals of the secondary winding of the respective device 71 . . . 7n and to the negative terminal 81a, 82a, . . . 8na of the respective chain of LED diodes supplied by the device 71 . . . 7n. The check is implemented by checking the duration of the step of the signal D. During the voltage step of the signal D the transistor M2 is switched on and the transistor M1 is switched off; the current stabilized by the respective device 81, 82 . . . 8n is sent to the respective chain of LED diodes. In the absence of a voltage step, the transistor M1 is switched on and the transistor M2 is switched off; the output current from the respective transformer 71, 72 . . . 7n is sent to the transistor MOS M1 and to the respective terminal 71c, 72c . . . 7nc. During the check or adjustment the amplitude of the triangular wave shape of the current that flows on the primary winding or on the secondary winding of the transformers is not substantially altered but only the frequency and the triangular shape; the output current of the other channels remains stable and the power leaked by the device 3 is reduced. Further, said control device does not create acoustic vibration problems for the cores of the transformer.

Preferably, in order to prevent slight visible frequency variations of the light flow, all the timings, i.e., the duration of the steps and the frequency of the repetition thereof, are set by a numeric control and the start of the interval in which the LED diodes are supplied is synchronized for all the channels.

In the case of a sole-channel power supply the current Isr coming from the device 5 will be sent to a sole device 81 suitable for correcting and leveling the current Isr; preferably, to increase the performance of the power supply, it is possible to place between the devices 5 and 81 a sole transformer 71 with a sole primary winding and a sole secondary winding. The corrected current Isr will be sent to the plurality of diodes 81dl1 . . . 81dln; the use of a sole device 91 and a sole device 101 is provided.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A power supply of luminous sources, comprising:
   first means for generating a direct voltage signal starting with an alternating input voltage;
   second means for inputting said direct voltage signal and being for generating an alternating voltage signal of rectangular wave shape and null average value;
   third means for generating a current signal of triangular wave shape from the alternating voltage signal of rectangular wave shape and null average value;
   fourth means for extracting from said current signal of triangular wave shape a voltage signal of triangular wave shape and non-null average value;
   fifth means for controlling the frequency of the alternating voltage signal of rectangular wave shape and null average value in function of an average value of the voltage signal extracted by said fourth means; and
   sixth means for rectifying said current signal of triangular wave shape coming from said third means and for supplying the luminous sources.

2. A power supply according to claim 1, comprising a transformer interposed between said third and sixth means, said transformer comprising:
   a primary winding configured to be passed through by said current signal of triangular wave shape coming from said third means; and
   a secondary winding configured to be passed through by a current with a value given by a value of the current that flows in the primary winding for a transformation ratio.

3. A power supply according to claim 2, wherein:
   said primary winding is one of a plurality of primary windings arranged in series and configured to be passed through by said current signal of triangular wave shape coming from said third means; and
   said secondary winding is one of a plurality of secondary windings respectively coupled to the primary windings and configured to be respectively flowed through by respective currents having respective values given by the value of the current flowing in the respective primary windings according to respective transformation ratios, said currents that flows in the secondary windings being independent from one another.

4. A power supply according to claim 3, wherein the transformer includes a plurality of tertiary windings having respective first terminals connected in common and respective second terminals, the power supply further comprising Zener diodes having respective cathodes and respective anodes, the respective cathodes being coupled respectively to the second terminals of the tertiary windings and the respective anodes being connected in common, said Zener diodes each being configured to turn off said second means when the Zener diode starts to lead.

5. A power supply according to claim 2, wherein the transformer includes a tertiary winding having a terminal, the power supply further comprising a Zener diode coupled to the terminal of the tertiary winding and configured to turn off said second means when the Zener diode starts to lead.

6. A power supply according to claim 2, comprising other means for regulating a current flow from said transformer to said luminous sources.

7. A power supply according to claim 6, wherein:
   said primary winding is one of a plurality of primary windings arranged in series and configured to be passed through by said current signal of triangular wave shape coming from said third means; and
   said secondary winding is one of a plurality of secondary windings respectively coupled to the primary windings and configured to be respectively flowed through by respective currents having respective values given by the value of the current flowing in the respective primary windings according to respective transformation ratios, said currents that flows in the secondary windings being independent from one another, wherein said sixth means comprises a plurality of rectifying devices respectively associated with the secondary windings of the transformer, each rectifying device being configured to rectify a current that flows in the respective secondary winding of the transformer, the rectifying devices comprising respective capacitors configured to supply respective supply currents to respective pluralities of luminous sources independently of one another.

8. A power supply according to claim 7, wherein said other means comprise a plurality of regulators associated respectively with the rectifying devices, said regulators being configured to regulate the supply currents, respectively.

9. A power supply according to claim 8, wherein each regulator of the plurality of regulators is configured to enable the respective supply current to flow from the respective rectifying device to the respective plurality of luminous sources and prevent the current flow as a function of an external signal.

10. A power supply according to claim 9, wherein said external signal is a step signal at a frequency of substantially 100 Hz.

11. A power supply according to claim 9, wherein each regulator of the plurality of regulators comprises a first transistor configured to enable or prevent current passing between a negative terminal of said respective plurality of luminous sources to a central terminal of the respective secondary winding and a second transistor configured to prevent or enable current to pass between outer terminals of said respective secondary winding and said central terminal of the respective secondary winding.

12. A power supply according to claim 1, wherein said fourth means comprises a transformer.

13. A power supply according to claim 1, wherein said second means comprises an inverter configured to be supplied by said direct voltage signal and generate the alternating voltage signal of rectangular wave shape and null average value, said fifth means being for increasing or decreasing the frequency of the alternating voltage signal of rectangular wave shape and null average value when said non-null average value of the voltage extracted by said fourth means is greater or less than a reference value.

14. A lighting device, comprising:
   a plurality of luminous sources; and
   a power supply configured to power said luminous sources, the power supply including:
      first means for generating a direct voltage signal starting with an alternating input voltage;
      second means for inputting said direct voltage signal and being for generating an alternating voltage signal of rectangular wave shape and null average value;
      third means for generating a current signal of triangular wave shape from the alternating voltage signal of rectangular wave shape and null average value;
      fourth means for extracting from said current signal of triangular wave shape a voltage signal of triangular wave shape and non-null average value;
      fifth means for controlling the frequency of the alternating voltage signal of rectangular wave shape and null average value in function of an average value of the voltage signal extracted by said fourth means; and sixth means for rectifying said current signal of triangular wave shape coming from said third means and for supplying the luminous sources.

15. The lighting device according to claim 14, wherein said luminous sources are LED diodes.

16. The lighting device according to claim 14, wherein the power supply includes a transformer interposed between said third and sixth means, said transformer comprising:
   a primary winding configured to be passed through by said current signal of triangular wave shape coming from said third means; and
   a secondary winding configured to be passed through by a current with a value given by a value of the current that flows in the primary winding for a transformation ratio.

17. A lighting device, comprising:
   a plurality of luminous sources; and
   a power supply configured to power said luminous sources, the power supply including:
      an inverting device configured to generate an alternating voltage signal of rectangular wave shape and null average value;
      an inductor configured to generate a current signal of triangular wave shape from the alternating voltage signal of rectangular wave shape and null average value;
      a current to voltage converting circuit configured to output a voltage control signal of triangular wave shape and non-null average value, based on the current signal of triangular wave shape, wherein the inverting device includes a controller configured to control the frequency of the alternating voltage signal of rectangular wave shape and null average value based on the voltage control signal output by the current to voltage converting circuit; and
      a rectifying device coupled to the inductor and configured to supply the luminous sources.

18. A lighting device according to claim 17, wherein the power supply includes a transformer coupled between said inductor and said rectifying device, said transformer comprising:
   a primary winding configured to be passed through by said current signal of triangular wave shape; and
   a secondary winding configured to be passed through by a current with a value given by a value of the current that flows in the primary winding for a transformation ratio.

19. A lighting device according to claim 18, wherein:
   said primary winding is one of a plurality of primary windings arranged in series and configured to be passed through by said current signal of triangular wave shape; and
   said secondary winding is one of a plurality of secondary windings respectively coupled to the primary windings and configured to be respectively flowed through by respective currents having respective values given by the value of the current flowing in the respective primary windings according to respective transformation ratios, said currents that flows in the secondary windings being independent from one another.

20. A lighting device according to claim 19, wherein the transformer includes a plurality of tertiary windings having respective first terminals connected in common and respective second terminals, the power supply further comprising Zener diodes having respective cathodes and respective anodes, the respective cathodes being coupled respectively to the second terminals of the tertiary windings and the respective anodes being connected in common, said Zener diodes each being configured to turn off said second means when the Zener diode starts to lead.

21. A lighting device according to claim 18, wherein the transformer includes a tertiary winding having a terminal, the power supply further comprising a Zener diode coupled to the terminal of the tertiary winding and configured to turn off said second means when the Zener diode starts to lead.

22. A lighting device according to claim 18, wherein:
   said luminous sources include a plurality of pluralities of luminance sources;
   said primary winding is one of a plurality of primary windings arranged in series and configured to be passed through by said current signal of triangular wave shape coming from said third means;
   said secondary winding is one of a plurality of secondary windings respectively coupled to the primary windings and configured to be respectively flowed through by respective currents having respective values given by the value of the current flowing in the respective primary windings according to respective transformation ratios, said currents that flows in the secondary windings being independent from one another; and
   said rectifying device is one of a plurality of rectifying devices respectively associated with the secondary windings of the transformer, each rectifying device being configured to rectify a current that flows in the respective secondary winding of the transformer, the rectifying devices comprising respective capacitors configured to respectively supply respective supply currents to the pluralities of luminous sources independently of one another.

23. A lighting device according to claim 22, wherein said power supply includes a plurality of regulators associated respectively with the rectifying devices, said regulators being configured to regulate the supply currents, respectively.

24. A lighting device according to claim 23, wherein each regulator of the plurality of regulators comprises a first transistor configured to enable or prevent current passing between a negative terminal of a respective one of the pluralities of luminous sources to a central terminal of the respective secondary winding and a second transistor configured to prevent or enable current to pass between outer terminals of said respective secondary winding and said central terminal of the respective secondary winding.

25. A lighting device according to claim 17 wherein the rectifying device is configured to supply the luminous sources with a rectified signal based on the current signal of triangular wave shape.

26. A power supply according to claim 1, wherein the sixth means are for producing a rectified signal, by rectifying said current signal of triangular wave shape coming from said third means, and for supplying the luminous sources with the rectified signal.

27. A lighting device according to claim 14, wherein the sixth means are for producing a rectified signal, by rectifying said current signal of triangular wave shape coming from said third means, and for supplying the luminous sources with the rectified signal.

* * * * *